(12) United States Patent
Sauve et al.

(10) Patent No.: US 11,546,365 B2
(45) Date of Patent: Jan. 3, 2023

(54) COMPUTER NETWORK SECURITY ASSESSMENT ENGINE

(71) Applicant: Avast Software s.r.o., Prague (CZ)

(72) Inventors: Alain G. Sauve, Ottawa (CA); Syed Kamran Bilgrami, Ottawa (CA)

(73) Assignee: Avast Software s.r.o., Prague (CZ)

( * ) Notice: Subject to any disclaimer, the term of this patent is extended or adjusted under 35 U.S.C. 154(b) by 288 days.

(21) Appl. No.: 16/256,418

(22) Filed: Jan. 24, 2019

(65) Prior Publication Data

US 2019/0238582 A1 Aug. 1, 2019

Related U.S. Application Data

(60) Provisional application No. 62/622,919, filed on Jan. 28, 2018.

(51) Int. Cl.
| | | |
|---|---|---|
| *H04L 9/40* | (2022.01) | |
| *H04L 41/22* | (2022.01) | |
| *H04L 43/50* | (2022.01) | |
| *H04L 41/046* | (2022.01) | |

(52) U.S. Cl.
CPC .......... *H04L 63/1433* (2013.01); *H04L 41/22* (2013.01); *H04L 43/50* (2013.01); *H04L 63/20* (2013.01); *H04L 41/046* (2013.01)

(58) Field of Classification Search
CPC ..... H04L 63/1433; H04L 63/20; H04L 43/50; H04L 41/22
See application file for complete search history.

(56) References Cited

U.S. PATENT DOCUMENTS

| | | | | |
|---|---|---|---|---|
| 10,915,638 | B2* | 2/2021 | Czaplewski | G06F 21/577 |
| 2003/0217039 | A1* | 11/2003 | Kurtz | G02B 6/12023 |
| 2006/0218639 | A1* | 9/2006 | Newman | G06F 21/46 |
| | | | | 726/25 |
| 2007/0143851 | A1* | 6/2007 | Nicodemus | G06F 21/577 |
| | | | | 726/25 |

(Continued)

FOREIGN PATENT DOCUMENTS

WO 2016064433 A1 4/2016

OTHER PUBLICATIONS

"Weighted Mean", mathisfun.com. pp. 1-4. retrieved via web.archive.org. (Year: 2013).*

*Primary Examiner* — John M MacIlwinen
(74) *Attorney, Agent, or Firm* — Avek IP, LLC; William B. Kircher

(57) ABSTRACT

A network security assessment engine can assess security on a remote computer network. Agent programs on computing devices on the remote network can execute security tests. The network security assessment engine receives security test results produced by the security tests. The network security assessment engine can determine security test scores based, at least in part, on the security test results. The network security assessment engine can determine an overall network security score based, at least in part, on the security test scores and present the overall network security score. As an example, a network services provider can utilize the network security assessment engine to provide an adaptive, expressive scoring mechanism, allowing the network services provided to more efficiently digest, assess, and report network anomalies within a multitenant context.

12 Claims, 4 Drawing Sheets

(56) References Cited

U.S. PATENT DOCUMENTS

| | | | |
|---|---|---|---|
| 2010/0114634 A1* | 5/2010 | Christiansen | G06Q 30/018 |
| | | | 705/317 |
| 2014/0351940 A1* | 11/2014 | Loder | H04L 41/0856 |
| | | | 726/25 |
| 2016/0127417 A1 | 5/2016 | Janssen | |
| 2016/0134653 A1* | 5/2016 | Vallone | H04L 41/046 |
| | | | 726/25 |

* cited by examiner

COMPUTER NETWORK SECURITY ASSESSMENT ENGINE

CROSS-REFERENCE TO RELATED APPLICATIONS

This Application claims priority to U.S. Provisional Patent Application Ser. No. 62/622,919, filed Jan. 28, 2018, entitled "NETWORK ASSESSMENT ENGINE,", the entire disclosure of which is incorporated herein by reference.

FIELD

The disclosure relates generally to networks of computer systems, and more particularly to assessing network security in local networks of computer systems.

BACKGROUND

The security of local networks and the devices on the network is extremely important. Malware of all kinds of types continually threatens the security and even financial well-being of network owners. A single successful ransomware attack can result in the loss of thousands of dollars either to pay the ransom in order to decrypt the victim's data, or in fees to recover the victim's data. Other types of malware can result in the loss of confidential information leading to identity theft. Therefore, it is important for network owners to be able to accurately assess the security of a network and the devices on the network.

Some networks are remotely monitored and managed, at least in part, by automated processes. For example, computing devices can implement automated network services to manage and monitor various aspects of remotely located networks and computing devices. These management and monitoring services can obtain and maintain data records about the performance and activity of the network and computing devices. Exemplary performance and activity records include network bandwidth usage and availability, processor usage and availability, memory usage and availability, application usage, software driver status, software patch status, and the like. However, conventional techniques are unable to identify and communicate security risks that exist within the network.

SUMMARY

Systems and methods enable assessing security risks on remote networks by (i) causing a plurality of agents on a plurality of computing devices on the network to execute a plurality of security tests on a plurality of properties of the network or the computing devices through which security of the network is compromisable; (ii) receiving, by a network security assessment engine remote from the plurality of computing devices, a plurality of security test results produced by the plurality of security tests from the plurality of computing devices; (iii) determining, by the network security assessment engine, a plurality of security test scores based, at least in part, on the plurality of security test results, wherein the plurality of security tests each correspond to at least one property of the network or computing devices through which security of the network is compromisable; (iv) determining, by the network security assessment engine, an overall network security score based, at least in part, on the plurality of security test scores; and (iv) presenting a representation of the overall network security score in combination with representations of the plurality of security test scores, thereby communicating the properties of the network or computing devices contributing to the overall network security score.

BRIEF DESCRIPTION OF THE DRAWINGS

For a better understanding of the inventive subject matter, reference may be made to the accompanying drawings in which.

DETAILED DESCRIPTION

Figure 1:
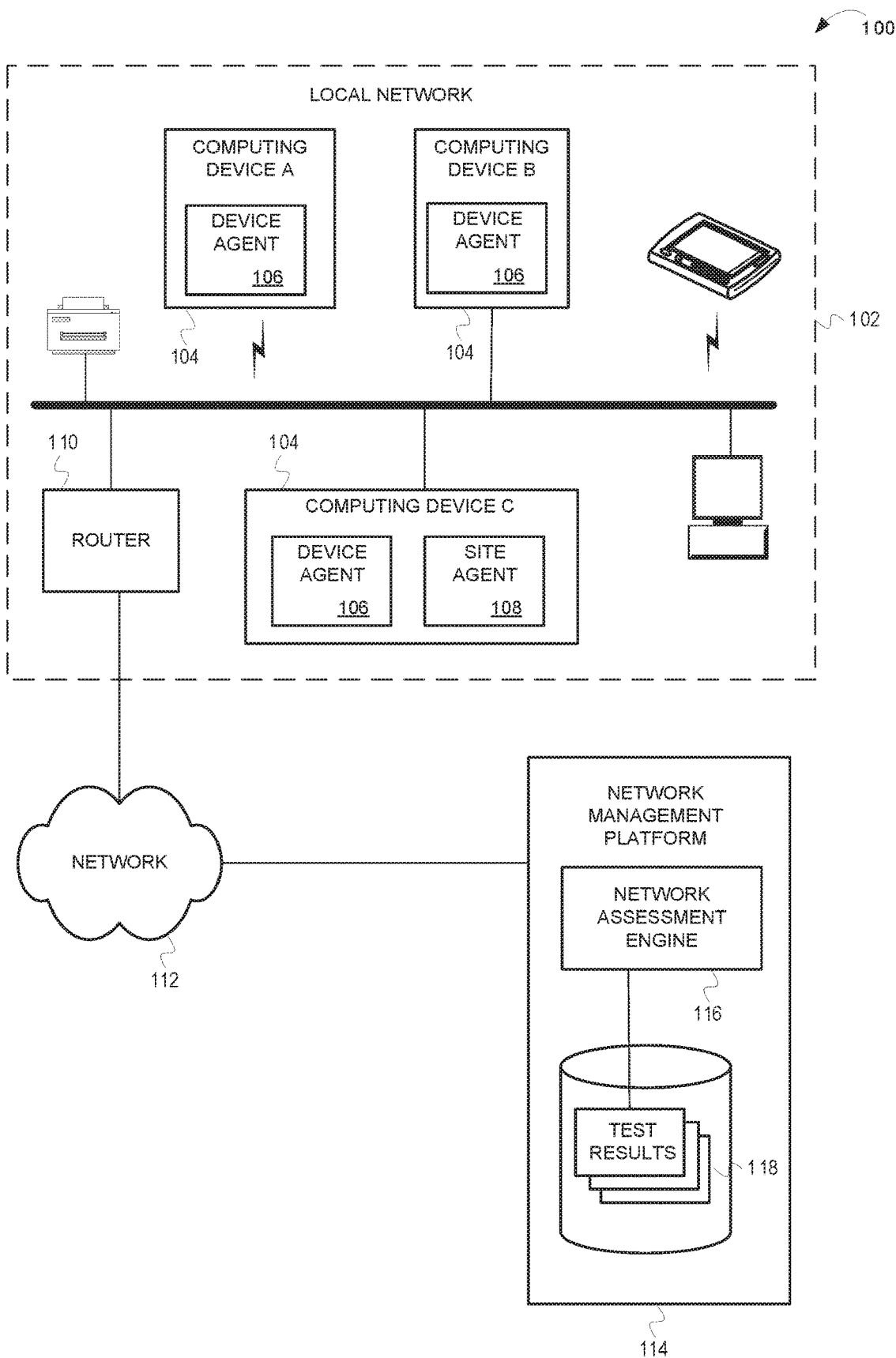
FIG. 1 is a block diagram illustrating an example network security assessment system according to embodiments.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Embodiments of the invention include a network security assessment engine that includes formulations and mechanisms for computing reliable and trustworthy measurements of a network's resilience to security threats in order to identify security shortcomings/risks of the network. The network security assessment engine can succinctly communicate the results of potentially numerous security assessments. The network security assessment engine can adapt to newly discovered threats and can also be tailored to suit the needs of any of particular users. In some embodiments, the network security assessment engine communicates the factors contributing to risks on the network (e.g., presenting a visual representation indicative of how not changing passwords directly affects overall security, etc.) which allows for a greater understanding of why the overall network security score is at a certain level. This important information enables identifying security problems present on a given network, determining how to increase the security of the network, and prioritizing actions needed to improve the security.

FIG. 1 is a block diagram illustrating an example system 100 for assessing network security according to embodiments. In some embodiments, system 100 can include a local network 102 communicably coupling one or more computing devices 104, a router 110, and other network attached devices. The computing devices 104 can each include a device agent 106 and/or a site agent 108. In addition, system 100 can include a network management platform 114 communicably coupled to local network 102 via network 112. The network management platform 114 can include a network security assessment engine 116 and one or more databases including test results 118.

Local network 102 is capable of facilitating the exchange of data (e.g., network packets, etc.) among computing devices 104, router 110, and other devices attached to the local network 102. Local network 102 can be a wired network, a wireless network, or a combination of the two. In some embodiments, local network 102 can be a home network. In alternative embodiments, local network 102 can be a network in a small business or a corporate network. The local network 102 includes networks that utilize a private IP address space. Although the geographic scale/spatial scope of local network 102 is not limited to any particular type of local network, examples of networks that can comprise local network 102 include, but are not limited to, a nanoscale network, a near-field network, a body area network (BAN), a personal area network (PAN), a near-me area network (NAN), a local area network (LAN), a wireless local area network (WLAN), a home area network (HAN), a storage area network (SAN), and a campus area network (CAN). In other embodiments, local network 102 is any medium that allows data to be physically transferred through serial or parallel communication channels (e.g., copper wire, optical fiber, computer bus, wireless communication channel, etc.).

Computing device 104 can be any type of computing device having a processor, memory, and network interface to communicably couple the computing device 104 to local network 102. For example, computing device 104 can be a desktop computer, a server computer, a laptop computer, a tablet computer, a smartphone, a set-top box, a video game console, an Internet of Things (IoT) device, or the like.

Router 110 is a gateway device that transmits and receives network data (e.g., data packets, etc.) for devices on local network 102 to/from network 112. Router 110 can be a standalone router, a wireless router or access point, a modem/router, or any other device that forwards data between two networks.

Local network 102 can include other network attached devices such as printers, scanners, copiers, and the like. Further, local network 102 can include one or more Internet of Things (IoT) devices. Examples of IoT devices include, but are not limited to, smart televisions, smart home appliances, sensors, biochips, office devices, implantable medical devices, and vehicle-based devices.

Network 112 can communicably couple network management platform 114 to local network 102. Network 112 can be a wired network, wireless network, or combination of the two. In some embodiments, network 112 can be an Internet Service Provider (ISP) network. In alternative embodiments, network 112 can be an intranet, such as a corporate intranet. The embodiments are not limited to any particular type of network for network 112. In some embodiments, network 112 can be a network that utilizes a public IP address space. Although the geographic scale/spatial scope of network 112 is not limited, examples of networks that can comprise network 112 include, but are not limited to, a backbone network, a metropolitan area network (MAN), a wide area network (WAN), a global area network (GAN), a public switched telephone network (PSTN), and an Internet area network (IAN). In another embodiment, network 112 is any medium that allows data to be physically transferred through serial or parallel communication channels (e.g., copper wire, optical fiber, computer bus, wireless communication channels, etc.).

Network management platform 114 can be a server (or multiple servers) that can provide management, monitoring, and analysis services for local networks such as local network 102. In some embodiments, network management platform 114 can be the Managed Workplace product available from AVAST Software s.r.o. of Prague, Czech Republic. Network management platform 114 can include a network security assessment engine 116.

Network security assessment engine 116 can communicate with device agents 106 and site agents 108 on computing devices 104 of a local network 102. For example, network security assessment engine 116 can cause a device agent 106 and/or site agent 108 to execute one or more test programs designed to assess aspects of the computing devices 104 and/or local network 102. In some embodiments, the tests assess the state(s) of various software and/or hardware properties/attributes (e.g., settings, policies, hardware installation states, software installation states, etc.) relating to and/or indicative of security of the computing devices 104 and/or local network 102. In addition, network security assessment engine 116 can execute its own test programs to assess the security of local network 102. Network security assessment engine 116 can receive the results 118 of the test programs, and can analyze and assess the security of local network 102 and the devices on local network 102 based on the test results 118. For example, network security assessment engine 116 can determine security test scores, group security test scores, weight security test scores, determine security category scores, weight security category scores, and generate an aggregate security score, as further described herein, to identify the assessed network/device states that are indicative of security risks of local network 102 and/or computing devices 104. The network security assessment engine 116 can store the test results 118 in a database on network management platform 114. The network security assessment engine 116 can also communicate the identified security risks and the impact that each particular security aspect has on the overall security of local network 102 and computing devices 104 as a whole. For example, network security assessment engine 116 can generate a dashboard interface, as further described herein, that can be displayed by a graphical user interface of a computing device. In some embodiments, the functionality performed by network security assessment engine 116 is provided by a processor of a computing device (e.g., a server computing device comprising network management platform 114) executing processor-executable instructions embodied in a tangible, non-transitory computer-readable medium, on which network security assessment engine 116 is embodied.

A device agent 106 can be an application (e.g., processor-executable instructions embodied in a tangible, non-transitory computer-readable medium, etc.) that can be downloaded or otherwise installed on one or more of the computing devices 104 (e.g., a laptop computer, tablet computer, desktop computer, smartphone, etc.) or other device on local network 102. In some embodiments, device agent 106 provides data regarding the computing device 104 on which it executes. The data can be used to assess the security of computing device 104. In alternative embodiments, device agent 106 can execute one or more test programs designed to assess the security of the computing device 104 on which it executes.

Site agent 108 can also be an application (e.g., processor-executable instructions embodied in a tangible, non-transitory computer-readable medium, etc.) that is downloaded or otherwise installed on a computing device 104 on local network 102. In some embodiments, site agent 108 can provide data regarding the local network 102. In alternative embodiments, site agent 108 can execute one or more test programs designed to assess the security of the local network 102 as a whole. For example, site agent 108 can execute tests designed to assess the security of router 110. Additionally, site agent 108 can execute tests to assess the security of devices that cannot download or otherwise install a device agent 106. For example, site agent 108 may execute test programs designed to assess the security of IoT devices on a local network 102. Although shown as a separate entity from device agent 106, the functionality performed by device agent 106 and site agent 108 can be combined into a single agent program in some embodiments. In some embodiments, the functionality performed by device agent 106 and/or site agent 108, separately or in combination, is provided by a processor of a computing device (e.g., computing devices 104) executing processor-executable instructions embodied in a tangible, non-transitory computer-readable medium, on which device agent 106 and/or site agent 108 are embodied.

As noted above, the results of various types of tests and data may be provided to the network security assessment engine 116. In some embodiments, the various types of tests determine the state of properties of local network 102 and/or computing devices 104 through which security of local network 102 is compromisable (i.e., able to be compromised, such as via malware, viruses, Trojans, worms, rootkits, etc.). For example, if an executed test reveals that the current state of antivirus software on computing devices 104 is less than perfect (e.g., does not satisfy industry best practices, etc.) then the security of local network 102 is able to be compromised by infecting the computing devices 104 with virus software. Examples of facts gathered by device agents 106 and/or the site agent 108 and subsequently analyzed and assessed by the network security assessment engine 116 can include, but are not limited to, various combinations of the following:

Computing device 104 (e.g., Workstation, etc.) Antivirus software detection

Computing device 104 (e.g., Workstation, etc.) Antivirus software status check

Computing device 104 (e.g., Workstation, etc.) Antivirus software evaluation

Computing device 104 Operating System (e.g., Windows®, etc.) Firewall—Domain profile status check Computing device 104 Operating System (e.g., Windows®, etc.) Firewall—Public profile status check Computing device 104 Operating System (e.g., Windows®, etc.) Firewall—Private profile status check Server computing device 104 antivirus software detection Local network 102 (e.g., Wi-Fi®, etc.) Secure Authentication Check Local network 102 (e.g., Wi-Fi®, etc.) Network Authentication and Encryption Evaluation Local network 102 (e.g., Wi-Fi®, etc.) Network SSID Name Status Check Local network 102 (e.g., Wi-Fi®, etc.) Network Strong Password Status Check User Account Control (UAC) (e.g., for users of computing devices 104, etc.) Enabled status check Automatic Updates (e.g., for computing devices 104, etc.) status check Software updates (e.g., for computing devices 104, etc.) evaluation—Critical updates Software updates (e.g., for computing devices 104, etc.) evaluation—Security updates Software updates (e.g., for computing devices 104, etc.) evaluation—Definition updates Software updates (e.g., for computing devices 104, etc.) evaluation—Feature packs Software updates (e.g., for computing devices 104, etc.) evaluation—Service packs Software updates (e.g., for computing devices 104, etc.) evaluation—Updates Software updates (e.g., for computing devices 104, etc.) evaluation—Update rollups Software updates (e.g., for computing devices 104, etc.) evaluation—Tools Operating System (e.g., Windows®, etc.) of computing devices 104 patch data collection Domain user account (e.g., for users of computing devices 104 on a domain of local network 102, etc.) data collection Domain user accounts (e.g., for users of computing devices 104 on a domain of local network 102, etc.)—Password expiry status check Domain user accounts (e.g., for users of computing devices 104 on a domain of local network 102, etc.)—Password changes status check Domain user accounts (e.g., for users of computing devices 104 on a domain of local network 102, etc.)—Password age status check Domain user accounts (e.g., for users of computing devices 104 on a domain of local network 102, etc.)—Reversible password encryption status check Domain user accounts (e.g., for users of computing devices 104 on a domain of local network 102, etc.)—Guest and krbtgt (Kerberos Ticket Granting Ticket) accounts status check Local user accounts (e.g., for users of computing devices 104)—Password expiry status check Local user accounts (e.g., for users of computing devices 104)—Password changes status check Local user accounts (e.g., for users of computing devices 104)—Password age status check Local user accounts (e.g., for users of computing devices 104)—Enabled guest account status check Domain (e.g., a domain of local network 102, etc.) policy data collection Domain (e.g., a domain of local network 102, etc.) password policy—Minimum password history status check Domain (e.g., a domain of local network 102, etc.) password policy—Maximum password age status check Domain (e.g., a domain of local network 102, etc.) password policy—Password complexity requirements status check Domain (e.g., a domain of local network 102, etc.) password policy—Reversible password encryption status check Domain (e.g., a domain of local network 102, etc.) account lockout policy—Lockout threshold status check Local account (e.g., local accounts of computing devices 104) policy data collection Local account (e.g., local accounts of computing devices 104) password policy—Minimum password history status check Local account (e.g., local accounts of computing devices 104) password policy—Minimum password age status check Local account (e.g., local accounts of computing devices 104) password policy—Password complexity requirements status check Local account (e.g., local accounts of computing devices 104) password policy—Reversible password encryption status check Local account (e.g., local accounts of computing devices 104) lockout policy—Lockout threshold status check As an example, the "Software updates evaluation—Security updates" test comprises a device agent 106 and/or a site agent 108 checking to see if any security updates are missing from one or more computing devices 104. Security updates are broadly released fixes for operating systems and applications installed and/or executed on computing devices 104, addressing security issues. It is desirable that security updates be applied as broadly and as soon as possible. Any system (e.g., computing device 104, etc.) with missing security updates can be vulnerable to attack and can potentially infect the rest of the network (e.g., local network 102). Consequently, the network security assessment engine 116 will identify any systems in such a vulnerable state from the security test results, determine security scores from the security test results, and provide (e.g., via a dashboard interface, etc.) practical countermeasures performable on the systems (e.g., computing devices 104) and/or network (e.g., local network 102) to help remediate the security risk.

It should be noted that although only one local network 102 is illustrated in FIG. 1, a network management platform 114 can receive data from many different local networks (e.g., a multitenant context).

Although shown as remote from local network 102, either or both network management platform 114 and network security assessment engine 116 can be hosted on a computing device 104 on local network 102.

The number and types of devices illustrated in FIG. 1 is to be considered as an example. Those of skill in the art having the benefit of the disclosure will appreciate that a local network 102 can include more or fewer devices and device types than that illustrated in FIG. 1.

Figure 2:
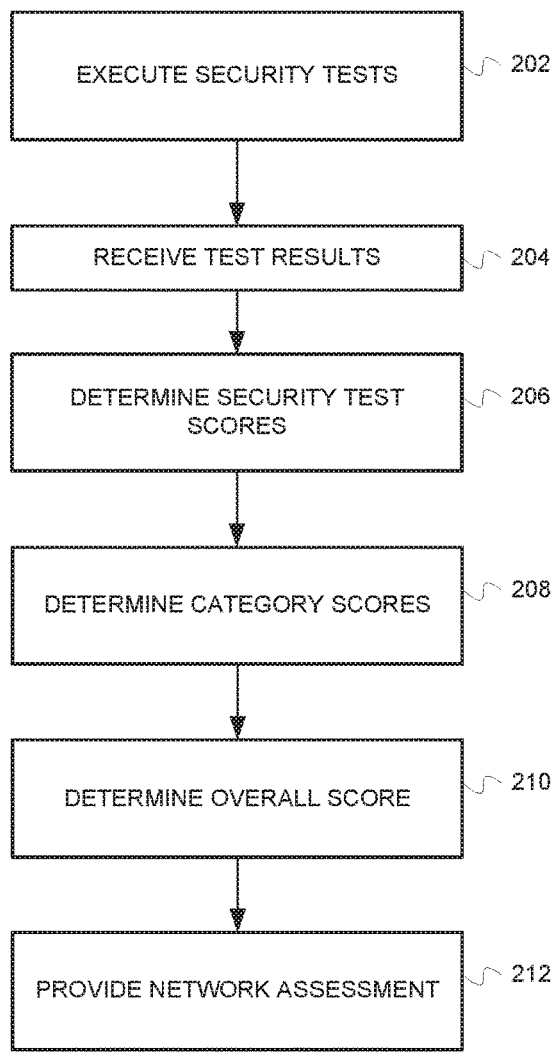
FIG. 2 is a flow chart illustrating operations of a method for assessing the security of a network and the devices on the network.
Figure 3:
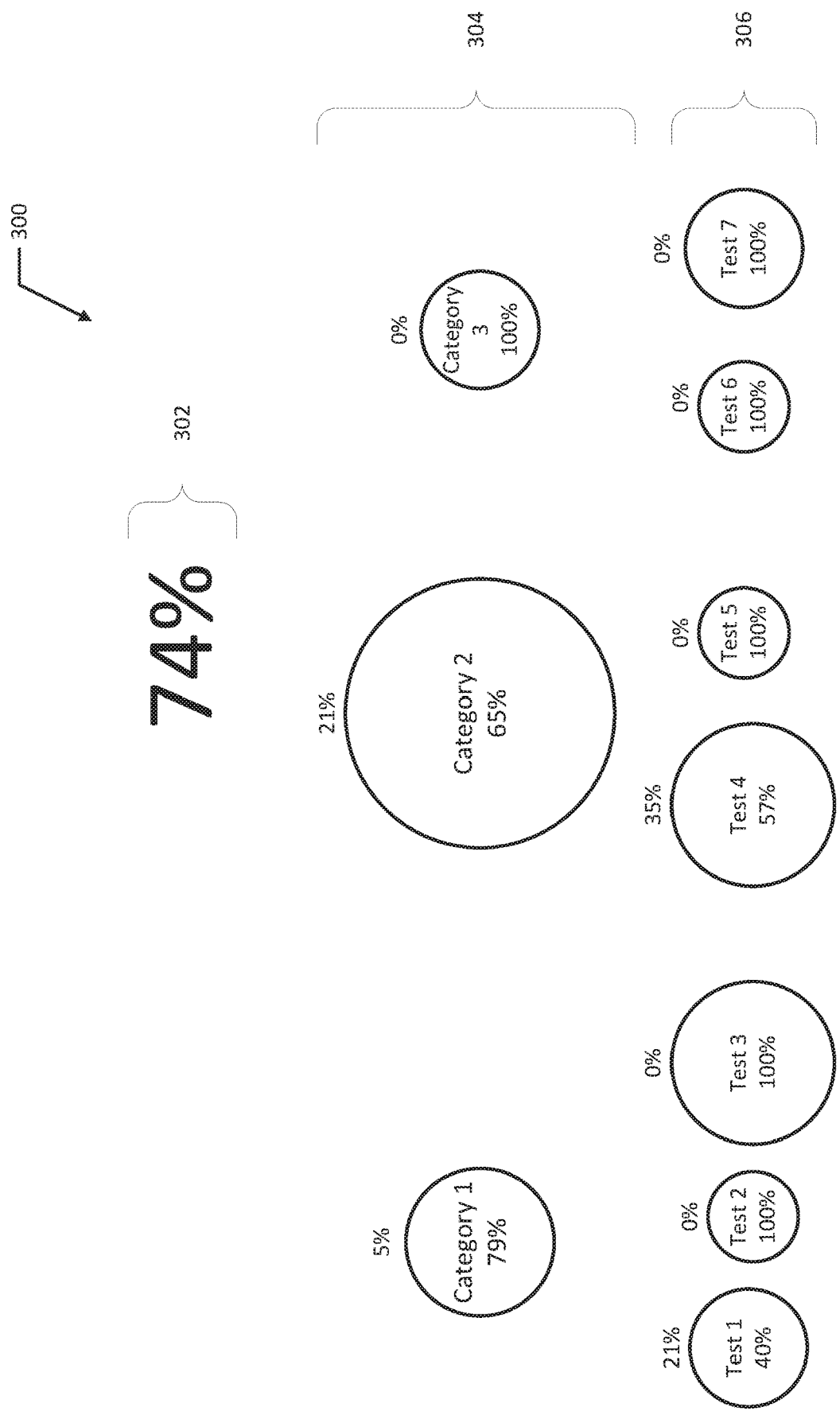
FIG. 3 illustrates an example output of a network security assessment engine according to embodiments.

Further details on the operation of the above described system 100 will now be presented with respect to FIGS. 2 and 3.

FIG. 2 is a flowchart 200 illustrating operations of a method for assessing the states of various software and/or hardware properties/attributes (e.g., settings, policies, hardware installation states, software installation states, etc.) of a network and/or the devices on the network that relate to security of the network and/or the devices on the network, identifying the assessed network/device states that are indicative of security risks of the network and/or the devices, and communicating the identified security risks and the impact that each particular security aspect has on the overall security of local network 102 and connected computing devices 104 as a whole. The method may, in some aspects, constitute one or more computer programs made up of computer-executable instructions. Describing the method by reference to a flowchart enables one skilled in the art to develop such programs including such instructions to carry out the methods on suitable processors (the processor or processors of the computer executing the instructions from computer-readable media). The method illustrated in FIG. 2 is inclusive of acts that may be taken by an operating environment executing example embodiments of the invention.

At block 202, one or more security tests are executed to assess the states of various software and/or hardware properties/attributes (e.g., settings, policies, hardware installation states, software installation states, etc.) of local network 102, computing devices 104, and/or other devices connected to the network that relate to security of the network and/or devices. In some embodiments, network security assessment engine 116 can cause a security test to be executed. For example, network security assessment engine 116 may execute security tests or may cause device agent 106 and/or site agent 108 to execute security tests on local network 102. In alternative embodiments, a security test can be executed on a periodic basis. In further alternative embodiments, a security test can be executed upon the occurrence of an event (e.g., a reboot of one or more computing devices 104, installation of software on one or more computing devices 104, scan for malware on one or more computing devices 104, etc.). The one or more security tests can be referred to as a TestSet. The one or more security tests can be security tests designed to identify and score any issues indicative of security shortcomings of local network 102 and/or computing devices 104 that might exist in the data produced by, or obtained by, the tests. Security tests can be as simple as verifying the state of a single network attribute of local network 102. They can also verify the state of one or multiple conditions on a collection of subjects (e.g., one or more computing devices 104, etc.). A security test can be as simple or as complex as needs be to score the particular security risk of local network 102 and/or computing devices 104 being assessed.

At block 204, network security assessment engine 116 can receive the results of the one or more security tests executed at block 202. For example, the network security assessment engine 116 may receive data indicative of the security test results from the computing devices 104, device agent 106, and/or site agent 108 via the router 110 and/or network 112. In some embodiments, a full set of results is received when the security tests are executed for the first time. Subsequently, the network security assessment engine 116 may receive results only when the security test results change. Such security test results can be provided in near real time in some embodiments.

At block 206, network security assessment engine 116 determines security scores based, at least in part, on the security test results received at block 204. In some embodiments, the security score of a security test can be any value between (and including) 0 and 1, where 1 can be considered a perfect score (i.e., no security risk). For example, the security score can be compared to guidance and/or best practices from reputable sources within the computer network security industry, which can be added to the network security assessment engine 116. Those of skill in the art will appreciate that other ranges of security scores could be used and are within the scope of the inventive subject matter. The security score may be referred to as a performance indicator or a security indicator in some embodiments.

When a security test is designed to operate on a collection of subjects (e.g., computing devices 104, etc.) on one particular local network 102, the average security score against all assessed subjects on the particular local network 102 can be considered the test's security score (referred to below as TestSetAverage). A "collection of subjects" can refer to a collection of analogous or similar objects for which a test was designed to operate against. As a non-limiting example, a test can assess one or several common attributes found in:
- a collection of devices (e.g., computing devices 104, etc.) running a server-class Windows® operating system, or
- a collection of devices (e.g., computing devices 104, etc.) running the Windows® operating system, or
- a collection of local user accounts on devices (e.g., computing devices 104, etc.) running the Windows® operating system, or
- a collection wireless area networks that devices (e.g., computing devices 104, etc.) from a given local area network (e.g., local network 102, etc.) have connected to, or
- a collection of active directory domain user accounts.

A security test score can be calculated as follows:

$$SecurityTestSet = \{SecurityTestScore_1, SecurityTestScore_2, \ldots SecurityTestScore_n\} \quad (1)$$

$$SecurityTestSetAverage = \frac{\sum_{i=1}^{n} SecurityTestScore_i}{n}$$

At block 208, the network security assessment engine 116 can determine security category scores. In some embodiments, test scores determined at block 206 can be broken down into categorized sub-scores. Thus, when a collection of related tests is grouped together into a security category, a specific kind of security threat can be independently scored and called out. In some embodiments, a security category can comprise a group of two or more security tests that have similarities. For instance, an Antivirus Security category could contain the following collection of security tests, in which the similarity is testing of antivirus software on computing devices 104:

Workstation Antivirus software detection—This test can determine if workstations on the site (e.g., computing devices 104 on the local network 102) have Antivirus software installed on them.

Workstation Antivirus software status check—This test determine if installed Antivirus software is enabled on workstations (e.g., computing devices 104).

Workstation Antivirus software evaluation—This test can determine if installed Antivirus software is up to date on workstations (e.g., computing devices 104).

Server antivirus software detection—This test can determine if servers on the site (e.g., sever computing devices 104 on the local network 102) have Antivirus software installed on them.

A Patch Security category could contain the following collection of security tests, in which the similarity is testing of patches for software installed and/or executed on computing devices 104:

Automatic Updates status check—This test checks to see if Automatic Updates is enabled on the computing devices 104 of the local network 102. Automatic Updates (AU) is the component of the update repository (e.g., Windows® Server Update Service (WSUS)) client that checks for, pulls down, and triggers installations and reboots of approved updates (e.g., Microsoft® updates) from the update repository (e.g., WSUS or Microsoft Update (MU), etc.). This component should be enabled to ensure the timely delivery of Microsoft® updates to Windows®-based operating systems.

Software updates evaluation—Critical updates—This test checks to see if critical software updates are missing from the computing devices 104. Critical updates are broadly released fixes for specific problems that address critical, non-security related bugs in the operating system and/or other application software installed and/or executed on computing devices 104.

Software updates evaluation—Security updates—This test checks to see if security updates are missing from the computing devices 104. Security updates are broadly released fixes for operating systems and application software installed and/or executed on computing devices 104, addressing security issues. It is a best practice for security updates to be applied as broadly and as soon as possible.

Software updates evaluation—Definition updates—This test checks if virus definitions (e.g., for Windows® Defender and Windows® Security Essentials, etc.) are missing from the computing devices 104. Definition updates are updates to virus, spyware, and other malware definition files used to identify malicious or potentially unwanted software on computing devices 104 (e.g., Windows® devices, etc.). Malicious software is constantly evolving, requiring that Antivirus definitions be kept up to date in order to protect from the latest threats.

Software updates evaluation—Feature packs—This test checks if feature packs are missing from computing devices 104. Feature packs are new feature releases for operating system and/or application software installed and/or executed on computing devices 104, usually rolled into products at the next release.

Software updates evaluation—Service packs—This test checks if service packs are missing from computing devices 104. Service packs are cumulative sets of all hotfixes, security updates, critical updates, and updates for operating system and/or application software installed and/or executed on computing devices 104 created since the release of the product. Service packs might also contain a limited number of customer-requested design changes or features.

Software updates evaluation—Updates—This test checks to see if software updates are missing from computing devices 104. Updates are broadly released fixes for specific problems that address non-critical, non-security related bugs in the operating system and/or other application software installed and/or executed on computing devices 104.

Software updates evaluation—Update rollups—This test checks to see if software update rollups are missing from computing devices 104. Update rollups are software updates that contain cumulative hotfixes, security updates, critical updates, and updates for operating system and/or application software installed and/or executed on computing devices 104 packaged together for easy deployment.

Software updates evaluation—Tools—This test checks to see if Tool updates are missing from computing devices 104. Tool updates are updates to utilities or features that aid in accomplishing a task or set of tasks for operating system and/or application software installed and/or executed on computing devices 104.

Operating System patch data collection—This test verifies that patch data for the operating system (e.g., Windows®, etc.) is successfully collected by computing devices 104 from an update repository (e.g., Windows® Server Update Services, etc.). If technical issues prevent the collection of patch data, patch-related security tests cannot execute for those devices.

Those of skill in the art having the benefit of the disclosure will appreciate that other security categories can be used and such security categories are within the scope of the inventive subject matter.

In some embodiments, each security test can be assigned a weight by the network management platform 114. These weightings can help determine the relative security threat level assessed by the security tests. For example, the weighting of a security test can be relative to other security tests within the same category when looking at the given category. The closer a test's weight is to 0, the more that the security risk associated with the security test may be accepted as tolerable. The greater a security test's weight (e.g., the closer it is to 1), the more that the security risk associated with the security test may be considered intolerable.

Additionally, security categories can be assigned weights in some embodiments. The security category weightings can help determine the impact each security category will have on the overall/aggregate network security score. For example, if a particular security category is assigned a weight of zero, all security tests within that category will have no impact on the overall/aggregate network security score (i.e., all security tests within that particular category are not security threats). A number of weighting schemes are available and can be selected (e.g., via a graphical dashboard interface displayed by a computing device, etc.) as appropriate by a user. For example, in some embodiments, each security category is assigned a weight, and the assigned weightings determine the relative importance of each security category score on the overall security assessment score. In alternative embodiments, a security category weight can be calculated based on the sum of the weights of each individual security test within its security category. In further alternative embodiments, a security category weight can be calculated based on the sum of the weights of each individual security test within its security category multiplied by the number of subjects (e.g., computing devices 104, etc.) that were assessed. Those of skill in the art having the benefit of the disclosure will appreciate that other security category weighting schemes are possible and within the scope of the inventive subject matter.

In some embodiments, a security category score can be calculated as follows:

$$SecurityCategoryScore = \frac{\sum_{t=1}^{n}(SecurityTestSetAverage_t * SecurityTestWeight_t)}{\sum_{t=1}^{n}(SecurityCategoryWeight_t)} \quad (2)$$

A less than perfect security test score can have an impact on the security category score and will bring down the security category score by a number of percentage points. The larger the value, the greater the security risk attributed to the related security test. The impact value of a security test can be used to help prioritize remedial activities and to help communicate (e.g., in a visually understandable manner, etc.) the relative threat level of security test results within a security category. The impact that a security test score has on a security category score can be measured as follows:

$$SecurityTestImpact = \frac{(1 - SecurityTestScore) * SecurityTestWeight}{\sum_{t=1}^{n}(SecurityTestWeight_t)} \quad (3)$$

At block 210, the network security assessment engine 116 determines an overall network security score. In some embodiments, the overall network security score can be calculated as follows:

$$NetworkSecurityScore = \frac{\sum_{c=1}^{n}(SecurityCategoryScore_c * SecurityCategoryWeight_c)}{\sum_{c=1}^{n}(SecurityCategoryWeight_c)} \quad (4)$$

A less than perfect security category score will bring down the overall network security score by a number of percentage points. The larger the value of the security category score, the greater the risk attributed to failed tests within the security category. This impact value can be used to help prioritize remedial activities and to help communicate (e.g., in a visual manner, etc.) the relative threat level of security categories. In some embodiments, the impact that a particular security category has on the overall network security score can be determined as follows:

$$SecurityCategoryImpact = \frac{(1 - SecurityCategoryScore) * SecurityCategoryWeight}{\sum_{c=1}^{n} (SecurityCategoryWeight_c)} \quad (5)$$

The various security scores in FIG. 3 can be used to communicate (e.g., in a visual manner) the security risks associated with a local network 102, and can also be used to determine remedial actions to lessen security risks.

FIG. 3 illustrates an example output 300 of a network security assessment engine 116 according to embodiments. In some embodiments, the output 300 can comprise a dashboard interface that can be presented via a graphical user interface (GUI) on a display of a computing device. Accordingly, in some embodiments, the output 300 can comprise a particular manner of summarizing and presenting information via electronic devices, such as one that restrains the type of data (e.g., computer network security assessment data, etc.) that can be displayed and/or one that causes the display to exist in a particular state. In this example illustrated in FIG. 3, the overall network security score 302 is graphically represented as a percentage (74%).

The three security categories 304 that make up this overall network security score 302 each have a weight, here graphically represented by the size of a circle associated with the security category. The larger the circle, the greater the weight of the security category 304 within the overall network security score 302. The number within each circle is the graphical representation of the security category score for the associated security category. The numbers above each circle associated with a security category graphically represents the impact of the particular security category 304 on the overall network security score 302. In the example illustrated in FIG. 3, security category 1 reduced the overall network security score 302 by 5 percentage points, security category 2 reduced the overall network security score 302 by 21 percentage points, and security category 3 had no negative effect on the overall network security score 302. Accordingly, the five percent reduction from security category 1 and the twenty-one percent reduction from security category 2 explains why the overall network security score 302 is seventy-four percent (100%−26%=74%). By graphically representing the weight and impact of security category 2 as being greater than the weight and impact of security category 1 (i.e., the circle of security category 2 being larger than the circle of security category 1) the output 300 communicates that the states of various software and/or hardware properties of local network 102 and/or computing devices 104 that are within security category 2 have a greater impact on the overall network security score 302 than the states of various software and/or hardware properties of local network 102 and/or computing devices 104 that are within security category 1. Moreover, by graphically representing the weight and impact of security category 2 as being greater than the weight and impact of security category 1 (i.e., the circle of security category 2 being larger than the circle of security category 1) the output 300 communicates that taking remedial actions to improve the security category score of security category 2 will have a greater impact on the overall network security score 302 than taking remedial actions to improve the score of security category 1. For example, the communication of this information to a user could aid the user in determining which remedial actions to prioritize.

The security tests 306 that are part of a security category 304 can also be graphically represented by circles. Security tests 1, 2, and 3 are associated with (e.g., grouped together to form) security category 1, security tests 4 and 5 are associated with (e.g., grouped together to form) security category 2, and security tests 6 and 7 are associated with (e.g., grouped together to form) security category 3. Again, the size of the circles graphically represents the relative weights of security tests within their security category. The larger the circle, the greater the weight of the security test 306 within the security category 304. The number within each circle is the graphical representation of the security test score for the security test associated with (e.g., graphically represented by) the circle. The numbers above each circle graphically represent the impact of the particular security test on the security category 304 score. Thus, in the example illustrated in FIG. 3, the score of security test 4 (57%) reduced the category score of security category 2 by 35% and the score of security test 5 (100%) had no effect on the category score of security category 2.

Figure 4:
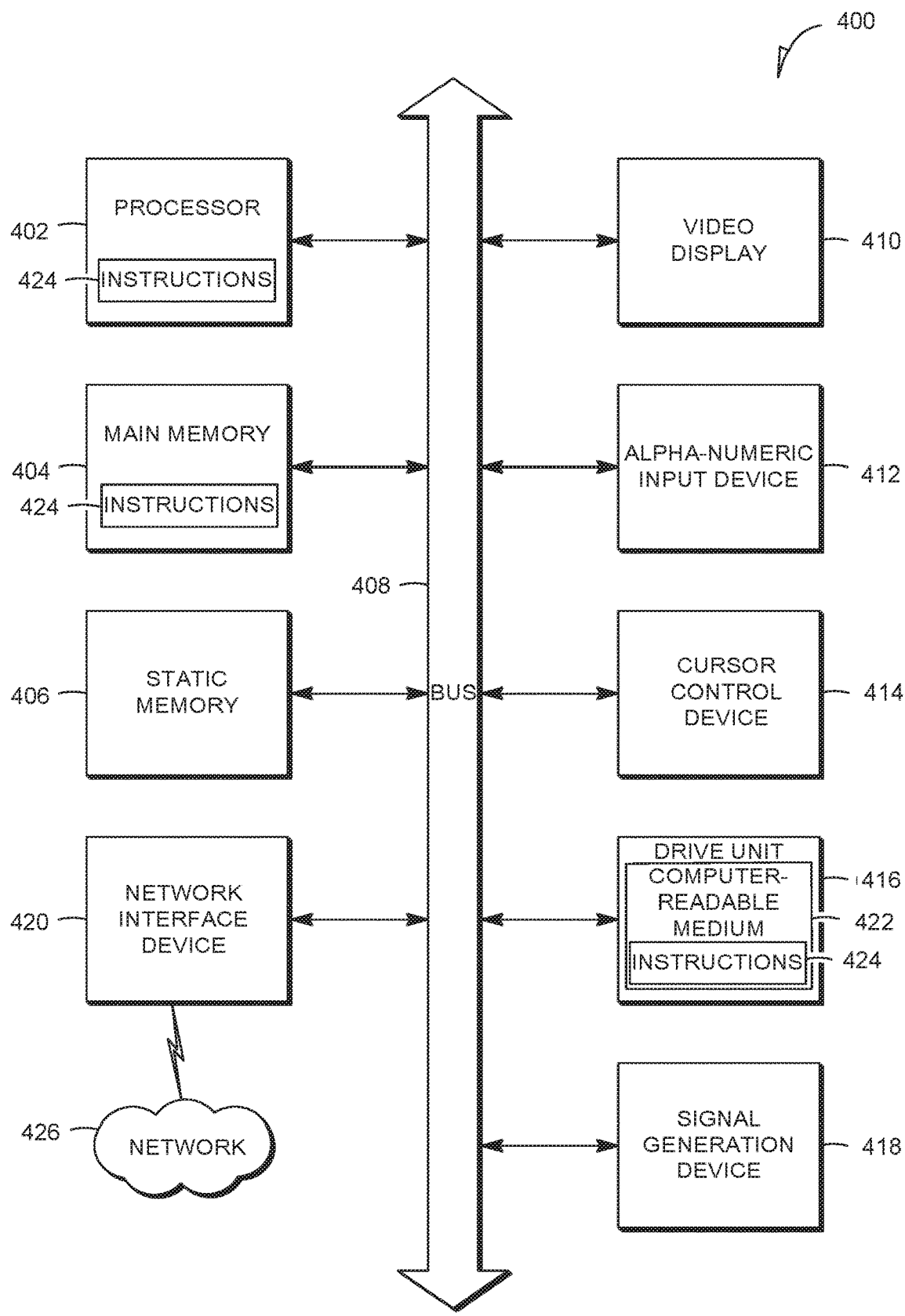
FIG. 4 is a block diagram of an example embodiment of a computer system upon which embodiments of the inventive subject matter can execute.

FIG. 4 is a block diagram of an example embodiment of a computer system 400 upon which embodiments of the inventive subject matter can execute. For example, computer system 400 may comprise, in whole or in part, aspects of network management platform 114, computing devices 104, and/or other devices attached to the local network 102. The description of FIG. 4 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 4 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 4, an example embodiment extends to a machine in the example form of a computer system 400 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 400 may include a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). In example embodiments, the computer system 400 also includes one or more of an alpha-numeric input device 412 (e.g., a keyboard), a user interface (UI) navigation device or cursor control device 414 (e.g., a mouse), a disk drive unit 416, a signal generation device 418 (e.g., a speaker), and a network interface device 420.

The disk drive unit 416 includes a machine-readable medium 422 on which is stored one or more sets of instructions 424 and data structures (e.g., software instructions) embodying or used by any one or more of the methodologies or functions described herein. The instructions 424 may also reside, completely or at least partially, within the main memory 404 or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 424 may further be transmitted or received over a communications network 426 using a signal transmission medium via the network interface device 420 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., Wi-Fi® and WiMax® networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

In an aspect, a method for assessing security on a network (e.g., local network 102) includes causing a plurality of agents (e.g., device agent 106, site agent 108, etc.) on a plurality of computing devices (e.g., computing devices 104) on the network to execute (e.g., block 202) a plurality of security tests on a plurality of properties of the network or the computing devices through which security of the network is compromisable (e.g., able to be compromised, such as via malware, viruses, Trojans, worms, rootkits, etc.). The method includes a network security assessment engine (e.g., network security assessment engine 116) that is remote from the computing devices receiving (e.g., block 204) a plurality of security test results produced by the plurality of security tests from the computing devices. The network security assessment engine determines (e.g., block 206) a plurality of security test scores based, at least in part, on the plurality of security test results. The security tests each correspond to at least one property of the network or computing devices through which security of the network is compromisable. Further, the network security assessment engine determines (e.g., block 210) an overall network security score based, at least in part, on the plurality of security test scores. The method further includes presenting a representation of the overall network security score (e.g., overall network security score 302) in combination with representations of the plurality of security test scores (e.g., security tests 306). In this manner, the network security assessment engine in accordance with the method communicates the properties of the network or the computing devices that contribute to the overall network security score, for example.

In some embodiments, the network security assessment engine determines (e.g., block 208) a security category score based, at least in part, on a subset of the plurality of security test scores. For example, the subset of scores have a similarity to each other such that the subset of scores comprise a security category. Moreover, the network security assessment engine can determine the overall network security score based, at least in part, on the security category score.

In further embodiments, the method includes presenting an indicator of an impact of each of the security category scores (e.g., security categories 304) on the overall network security score. In some embodiments, the method includes presenting an indicator of an impact of each of the subset of the plurality of security test scores associated with the security category on the security category score.

In some embodiments, the security category can be an antivirus security category and/or a patch security category. In further embodiments, the properties of the network or the computing devices through which security of the network is compromisable includes antivirus software properties, firewall properties, network secure authentication properties, network authentication and encryption properties, network name properties, network password properties, automatic update properties, software update properties, software patch properties, domain user account properties, local user account properties, domain properties, local account properties, and combinations thereof.

In another aspect, a system (e.g., network management platform 114) includes a network interface (e.g., network interface device 420), at least one processor (e.g., processor 402), and at least one non-transitory computer-readable storage medium (e.g., main memory 404) connected by a bus (e.g., bus 408). The network interface is configured to communicatively connect the system to a wide area network (e.g., network 112). The at least one non-transitory computer-readable storage medium stores one or more processor-executable instructions (e.g., instructions 424) that, when executed by the at least one processor, provide a network security assessment engine (e.g., network security assessment engine 116). The network security assessment engine is configured to cause a plurality of agents (e.g., device agent 106, site agent 108) on a plurality of computing devices (e.g., computing devices 104) on a local network (e.g., local network 102) to execute (e.g., block 202) a plurality of security tests on a plurality of properties of the local network or the computing devices. The properties on which the tests are executed are those through which the security of the local network is compromisable (e.g., able to be compromised, such as via malware, viruses, Trojans, worms, rootkits, etc.). The local network is communicatively coupled to the wide area network via a router (e.g., router 110). The network security assessment engine is further configured to receive (e.g., block 204) a plurality of security test results produced by the security tests from the computing devices and determine (e.g., block 206) a plurality of test scores based, at least in part, on the security test results. The security test results each correspond to at least one property of the network or the computing devices through which security of the network is compromisable. The network security assessment engine is further configured to determine (e.g., block 210) an overall network security score based, at least in part, on the security test scores and present (e.g., block 212) a representation of the overall network security score (e.g., overall network security score 302) in combination with representations of the plurality of security test scores (e.g., security tests 306). In this manner, the network security assessment engine in accordance with the system communicates the properties of the network or the computing devices that contribute to the overall network security score.

In yet another aspect, a non-transitory computer readable storage medium (e.g., machine-readable medium 422) includes a set of instructions (e.g., instructions 424) executable by a computer for assessing security on a network (e.g., local network 102). The non-transitory computer readable storage medium includes instructions for causing a plurality of agents (e.g., device agent 106, site agent 108, etc.) on a plurality of computing devices (e.g., computing devices 104) on the network to execute (e.g., block 202) a plurality of security tests on a plurality of properties of the network or the computing devices through which security of the network is compromisable (e.g., able to be compromised, such as via malware, viruses, Trojans, worms, rootkits, etc.). The non-transitory computer readable storage medium also includes instructions for receiving (e.g., block 204), by a network security assessment engine (e.g., network security assessment engine 116), a plurality of security test results produced by the plurality of security tests from the computing devices. The network security assessment engine is remote from the computing devices. The non-transitory computer readable storage medium further includes instructions for determining (e.g., block 206) a plurality of security test scores based, at least in part, on the plurality of security test results. The security tests each correspond to at least one property of the network or computing devices through which security of the network is compromisable. The non-transitory computer readable storage medium also includes instructions for determining (e.g., block 210) an overall network security score based, at least in part, on the plurality of security test scores. The non-transitory computer readable storage medium further includes instructions for presenting a representation of the overall network security score (e.g., overall network security score 302) in combination with representations of the plurality of security test scores (e.g., security tests 306). In this manner, the network security assessment engine in accordance with the method communicates the properties of the network or the computing devices that contribute to the overall network security score.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for assessing security on a network, the method comprising:
   causing a plurality of agents on a plurality of computing devices on the network to execute a plurality of security tests on a plurality of properties of the network or the computing devices through which security of the network is compromisable;
   receiving, by a network security assessment engine remote from the plurality of computing devices, a plurality of security test results produced by the plurality of security tests from the plurality of computing devices, the security test results comprising a plurality of security category scores and a plurality of corresponding security category weights;
   determining, by the network security assessment engine, a plurality of numerical security test scores based, at least in part, on the plurality of security test results, wherein the plurality of security tests each correspond to at least one property of the network or computing devices through which security of the network is compromisable;
   determining, by the network security assessment engine, an overall network security score based, at least in part, on the plurality of numerical security test scores, wherein the network security score is calculated from the plurality of security category scores and corresponding security category weights as:

$$\text{Network Security Score} = \frac{\sum_{c=1}^{n}(SecurityCategoryScore_c * SecurityCategoryWeight_c)}{\sum_{c=1}^{n}(SecurityCategoryWeight_c)};$$

presenting a representation of the overall network security score in combination with representations of the plurality of security test scores, thereby communicating the properties of the network or computing devices contributing to the overall network security score; and determining, by the network security assessment engine, a security category score based, at least in part, on a subset of the plurality of security test scores having a similarity to each other such that the subset of security test scores comprise a security category, wherein said determining the overall network security score includes determining, by the network security assessment engine, the overall network security score based, at least in part, on the security category score;

wherein said presenting the representation of the overall network security score in combination with the representations of the plurality of security test scores includes determining and presenting an indicator of an impact of each of the security category scores on the overall network security score, wherein determining an impact of each of the security category scores on the overall network security score is calculated as:

$$\text{Security Category Impact} = \frac{(1 - SecurityCategoryScore) * SecurityCategoryWeight}{\sum_{c=1}^{n}(SecurityCategoryWeight_c)}.$$

2. The method of claim 1, wherein said presenting the representation of the overall network security score in combination with the representations of the plurality of security test scores includes presenting an indicator of an impact of each of the subset of the plurality of security test scores associated with the security category on the security category score.

3. The method of claim 1, wherein the security category is at least one of an antivirus security category and a patch security category.

4. The method of claim 1, wherein the plurality of properties of the network or computing devices through which security of the network is compromisable includes antivirus software properties, firewall properties, network secure authentication properties, network authentication and encryption properties, network name properties, network password properties, automatic update properties, software update properties, software patch properties, domain user account properties, local user account properties, domain properties, local account properties, and combinations thereof.

5. A system, comprising:
a network interface configured to communicatively connect the system to a wide area network;
at least one processor connected to the network interface by a bus; and
at least one non-transitory computer-readable storage medium connected to the network interface and the at least one processor by the bus,
wherein the at least on non-transitory computer-readable storage medium stores one or more processor-executable instructions that, when executed by the at least one processor, provide a network security assessment engine configured to:
cause a plurality of agents on a plurality of computing devices on a local network to execute a plurality of security tests on a plurality of properties of the local network or the computing devices through which the security of the local network is compromisable, wherein the local network is communicatively coupled to the wide area network via a router;
receive a plurality of security test results produced by the plurality of security tests from the plurality of computing devices, the security test results comprising a plurality of security category scores and a plurality of corresponding security category weights;
determine a plurality of numerical security test scores based, at least in part, on the plurality of security test results, wherein the plurality of security test results each correspond to at least one property of the network or the computing devices through which security of the network is compromisable;
determine an overall network security score based, at least in part, on the plurality of numerical security test scores, wherein the network security score is calculated from the plurality of security category scores and corresponding security category weights as:

$$\text{Network Security Score} = \frac{\sum_{c=1}^{n}(SecurityCategoryScore_c * SecurityCategoryWeight_c)}{\sum_{c=1}^{n}(SecurityCategoryWeight_c)};$$

present a representation of the overall network security score in combination with representations of the plurality of security test scores, thereby communicating the properties of the network or the computing devices contributing to the overall network security score;
determine a security category score based, at least in part, on a subset of the plurality of security test scores having a similarity to each other such that the subset of security test scores comprise a security category;
determine the overall network security score based, at least in part, on the security category score;
determine and present an indicator of an impact of each of the security category scores on the overall network security score, wherein determining an impact of each of the security category scores on the overall network security score is calculated as:

$$\text{Security Category Impact} = \frac{(1 - SecurityCategoryScore) * SecurityCategoryWeight}{\sum_{c=1}^{n}(SecurityCategoryWeight_c)}.$$

6. The system of claim 5, wherein the at least one non-transitory computer-readable storage medium stores one or more processor-executable instructions that, when executed by the at least one processor, further configure the network security assessment engine to present an indicator of an impact of each of the subset of the plurality of security test scores associated with the security category on the security category score.

7. The system of claim 5, wherein the security category is at least one of an antivirus security category and a patch security category.

8. The system of claim 5, wherein the plurality of properties of the network or computing devices through which security of the network is compromisable includes antivirus software properties, firewall properties, network secure authentication properties, network authentication and encryption properties, network name properties, network password properties, automatic update properties, software update properties, software patch properties, domain user account properties, local user account properties, domain properties, local account properties, and combinations thereof.

9. A non-transitory computer readable storage medium comprising a set of instructions executable by a computer for assessing security on a network, the non-transitory computer readable storage medium comprising:
   instructions for causing a plurality of agents on a plurality of computing devices on the network to execute a plurality of security tests on a plurality of properties of the network or the computing devices through which security of the network is compromisable;
   instructions for receiving, by a network security assessment engine remote from the plurality of computing devices, a plurality of security test results produced by the plurality of security tests from the plurality of computing devices;
   instructions for determining, by the network security assessment engine, a plurality of numerical security test scores based, at least in part, on the plurality of security test results, wherein the plurality of security tests each correspond to at least one property of the network or computing devices through which security of the network is compromisable;
   instructions for determining, by the network security assessment engine, an overall network security score based, at least in part, on the plurality of numerical security test scores, wherein the network security score is calculated from the plurality of security category scores and corresponding security category weights as:

$$\text{Network Security Score} = \frac{\sum_{c=1}^{n}(SecurityCategoryScore_c * SecurityCategoryWeight_c)}{\sum_{c=1}^{n}(SecurityCategoryWeight_c)};$$

instructions for presenting a representation of the overall network security score in combination with representations of the plurality of security test scores, thereby communicating the properties of the network or computing devices contributing to the overall network security score;
   instructions for determining, by the network security assessment engine, a security category score based, at least in part, on a subset of the plurality of security test scores having a similarity to each other such that the subset of security test scores comprise a security category, wherein said determining the overall network security score includes determining the overall network security score based, at least in part, on the security category score; and
   instructions for determining and presenting an indicator of an impact of each of the security category scores on the overall network security score, wherein determining an impact of each of the security category scores on the overall network security score is calculated as:

$$\text{Security Category Impact} = \frac{(1 - SecurityCategoryScore) * SecurityCategoryWeight}{\sum_{c=1}^{n}(SecurityCategoryWeight_c)}.$$

10. The non-transitory computer readable storage medium of claim 9, further comprising instructions for presenting an indicator of an impact of each of the subset of the plurality of security test scores associated with the security category on the security category score.

11. The non-transitory computer readable storage medium of claim 9, wherein the security category is at least one of an antivirus security category and a patch security category.

12. The non-transitory computer readable storage medium of claim 9, wherein the plurality of properties of the network or computing devices through which security of the network is compromisable includes antivirus software properties, firewall properties, network secure authentication properties, network authentication and encryption properties, network name properties, network password properties, automatic update properties, software update properties, software patch properties, domain user account properties, local user account properties, domain properties, local account properties, and combinations thereof.

* * * * *